United States Patent [19]

Horber

[11] Patent Number: 5,444,368

[45] Date of Patent: Aug. 22, 1995

[54] DIFFERENTIAL REACTANCE PERMANENT MAGNET POSITION TRANSDUCER

[75] Inventor: Ralph W. Horber, Marshfield, Mass.

[73] Assignee: H. Magnetic Corp., Marshfield, Mass.

[21] Appl. No.: 180,324

[22] Filed: Jan. 10, 1994

[51] Int. Cl.⁶ .................. G01B 7/30; G01D 5/20; H02K 1/27

[52] U.S. Cl. .................. 324/207.16; 310/168; 318/653; 324/207.19; 324/207.25

[58] Field of Search .............. 324/163, 165, 166, 173, 324/174, 207.15–207.19, 207.25; 318/653, 659–661; 310/156, 168, 68 B; 340/671, 672, 870.31–870.35; 341/15

[56] References Cited

U.S. PATENT DOCUMENTS

| | | | |
|---|---|---|---|
| 1,929,259 | 10/1933 | Rich | 324/174 |
| 3,501,664 | 3/1970 | Veillette | 324/173 X |
| 3,688,306 | 8/1972 | Oishi et al. | 324/207.25 X |
| 4,406,983 | 9/1983 | Ramirez | 318/653 |
| 4,794,511 | 12/1988 | Lundin | 310/168 X |
| 4,924,180 | 5/1990 | Nasr et al. | 324/207.25 X |
| 5,140,245 | 8/1992 | Stacey | 318/723 |
| 5,160,886 | 11/1992 | Carlen | 324/207.16 |

Primary Examiner—Gerard R. Strecker
Attorney, Agent, or Firm—Ira S. Dorman

[57] ABSTRACT

A differential reactance permanent magnet transducer has a stator with at least two pole elements, each having an electrically conductive coil wound thereabout. The reluctances of the stator pole elements are periodically changed, in an electrically out-of-phase relationship to one another, due to the effects of permanent magnet elements moving in proximity thereto. Measurement of the reactance differentials that are thereby produced in coils mounted upon the two stator pole elements is utilized to sense the angular position of the transducer rotor. In addition to a high-resolution sensor zone and a commutation sensor zone, the transducer may include a home sensor zone to indicate a home position upon each revolution of the rotor. All of the coils employed on the stator are so arranged and electrically connected that no net back-EMF value is inductively generated from any coil as a result of movement of the rotor relative to the stator.

16 Claims, 18 Drawing Sheets

5,444,368

DIFFERENTIAL REACTANCE PERMANENT MAGNET POSITION TRANSDUCER

BACKGROUND OF THE INVENTION

This invention relates to a position transducer comprised of at least one sensor having an output that is based upon differential reactance.

Of the known position feedback transducers, optical encoders have severe drawbacks, including sensitivity to temperature and mechanical shock, difficult mounting and alignment requirements, and cable length limitations; optical encoders are particularly disadvantageous in electrically noisy environments. Although induction-based electromagnetic feedback transducers are generally reliable and accurate, they afford only single speed capability, typically with low electrical frequency, and they require relatively complex interfaces; such transducers are also sensitive to magnetically harsh and electrically noisy environments, they are subject to mechanical run-out, mounting and concentricity alignment are difficult, and they require integral transformers for contactless transfer of AC power to the rotor.

Non-permanent magnet reluctance-based transducers take advantage of variations in magnetic path reluctance, which occur when two ferromagnetic members slide or rotate past one another. In one known system, the difference of two reactances is measured to produce a sinusoidal output that has low harmonic content and distortion, and in which the frequency (number of electrical cycles per mechanical revolution) is relatively high. Disadvantages of devices of this kind include however single speed or frequency capability, sensitivity to magnetic disturbance fields, difficulty of mounting and concentricity establishment, and run-out tendencies.

In permanent magnet reluctance sensors, changes in path reluctance, produced by relative movement of ferromagnetic members, are used to modulate magnetic flux in stator poles. Despite knowledge of the principle, permanent magnets have seldom been used heretofore in position sensors; that is so primarily because voltages induced in the sensing coils by the magnetic flux field make the acquisition of accurate, high-resolution position information most difficult to achieve.

In U.S. Pat. No. 4,406,983, Ramirez discloses a rotational magnetic transducer for commutating a motor, which transducer affords tolerance to stray magnetic fields and a capability for operation in hostile environments. The device employs two coils per channel, so arranged that the permanent magnet-induced back-EMFs cancel one another. Output is determined by the total inductance of both coils, which contribute equally to the signal at all times and in all rotor positions.

Stacy U.S. Pat. No. 5,140,245 also provides a permanent magnet-based transducer that is suited for operation in hostile environments. The device is a three-phase, permanent magnet-excited voltage generator, which has a relatively low electrical frequency to enable commutation of a brushless DC/AC servo motor or other synchronous motor. The output from each of the three channels is a signal (a permanent magnet flux-induced voltage) having a magnitude that is directly related to rotational speed, the integral value of the signal therefore being indicative of rotational position.

A so-called "permanent magnet resolver" is disclosed in Carlen, U.S. Pat. No. 5,160,886, and is described as being based upon the use of two coils having back-EMF effects that are shifted 180° electrical from one another. The device is a two coil per channel, single reactance sensor, in which one electronic detector per coil is employed.

SUMMARY OF THE INVENTION

It is the broad object of the present invention to provide a novel differential reactance permanent magnet transducer that exhibits outstanding performance characteristics.

It is a more specific object of the invention to provide such a transducer having an output that is highly sinusoidal and low in harmonic and hysteresis content, for high accuracy, which transducer is also highly immune to hostile environmental conditions such as temperature, vacuum, radiation, vibration and magnetic disturbance fields, thus making it well suited for use in close proximity to magnetic motor structures.

Another broad object of the invention is to provide a permanent magnet transducer having a plurality of sensors, at least one of which generates differential reactance signals for position determination.

A more specific, related object is to provide such a transducer having three sensor sections, two of which rely upon differential reactances and constitute a high-resolution sensor and a commutation sensor, and the third functioning to indicate a home position.

It has now been found that certain of the foregoing and related objects of the invention are attained by the provision of a differential reactance, permanent magnet transducer comprised of a stator and an armature, the stator having a first section with at least two pole elements of ferromagnetic material thereon, each having an electrically conductive coil wound thereabout, and the armature having a first magnet section with at least one permanent magnet pole element thereon. The several pole elements are so disposed as to cause the magnet pole element of the armature to register sequentially with the pole elements of the first section of the stator, as the armature moves relative thereto; their disposition is also such that the flux density variation produced in one of the stator pole elements, as a result of movement of the magnet pole element relative thereto, varies in an out-of-phase relationship to the flux density variation produced in the other stator pole element. The coils on the stator pole elements have effectively equal numbers of turns, and are connected in series so as to provide at least one circuit having terminals to enable the application of voltages thereacross, and to enable measurement of voltage values at a junction between the coils, each of which coils comprises a leg of the circuit. Thus, the first stator section, the first magnet section, and the associated coils provide a first sensor section in which the values of voltages applied across the circuit will be so modulated as to enable the generation of signals that vary sinusoidally, as a function of armature position and reactance variation in the coils. Electrical and mechanical features of the transducer are such that no net back-EMF value is inductively generated in the coils as a result of movement of the armature relative to the stator.

The transducer armature will usually be a rotor having a plurality of magnet pole elements (normally at least four) equiangularly spaced from one another about its axis of rotation, and disposed to register with the first stator section pole elements. The first section of the stator employed therewith will usually comprise a multiplicity of pole elements, equiangularly spaced thereabout in a circular array.

In a preferred form of the transducer, the rotor will comprise a second magnet section axially spaced from the first, with each magnet section having at least one permanent magnet pole element thereon. The stator employed will similarly have a second section axially spaced from the first, which second section will also comprise at least two pole elements, each with an electrically conductive coil wound thereabout. The one magnet pole element of the one section of the rotor will be disposed (normally in a coplanar relationship) to register sequentially with the pole elements of the first stator section, to coact as a first transducer section; the one magnet pole element of the other rotor section will be disposed to register sequentially with the pole elements of the second stator section, to coact therewith as a second transducer section.

Generally, all of the magnet pole elements of such a transducer will be of the same strength, with the magnet pole elements of the one rotor section being of opposite polarity to those of the other rotor section. As will be appreciated, these features may readily be provided by a single, axially magnetized permanent magnet incorporated into the rotor structure. Each magnet pole element of the one rotor section may be mechanically aligned with a magnet pole element of the other rotor section, with each pole element of the first stator section being similarly aligned with a pole element of the second section. By winding a single coil about each pair of aligned stator pole elements, different portions of the coil will be subject to the same magnetic flux, moving however in opposite directions, thereby balancing and cancelling flux-induced back-EMF effects, and resulting in the production of no net back-EMF from the coil.

In those embodiments in which the rotator and the stator have at least two sections, the coil on at least one pole element of both of the stator sections may comprise a leg of each of a plurality of circuits. The magnet pole elements of the first rotor section may be mechanically offset relative to the magnet pole elements of the second rotor section, so as to produce an out-of-phase flux density variation relationship in the stator pole elements on which are wound the coils of which the legs of each such circuit-is comprised. Alternatively, the pole elements of the first stator section may be mechanically offset relative to the pole elements of the second stator section, or the required offset may be achieved by a combination of rotor and stator structural features. In addition, the magnet pole elements of the rotor sections and the pole elements of the stator sections may be so paired as to cause, in each transducer section, two magnet pole elements of the same polarity to register simultaneously with two stator pole elements in each orientation of registration. The coils on the paired stator pole elements will be series connected, as a circuit leg, and will be wound with opposite sense so as to balance back-EMF effects induced in those coils by flux from the magnet pole elements, thereby preventing any net back-EMF effect in the circuit leg.

Other objects of the invention are attained by the provision of a transducer having additional stator sections, magnet sections and coils, so disposed, wound, comprised and connected as to provide an additional sensor section having the same character as the first but in which the cycle frequency of signals generated is substantially different. Typically, the cycle frequency in the signal produced from one sensor section will have an even number, in the range two to eight per revolution of the rotor, and the cycle frequency of signals from the additional sensor section will be in the range 20 to 100 per revolution.

Normally, one of the sensor sections will comprise a "home" section by which a signal is generated at the start of each cycle of armature movement. Such a sensor section may comprise a second magnet section on the armature, having at least one permanent magnet pole element thereon, a second stator section having at least two ferromagnetic pole elements thereon, and at least one electrically conductive second coil wound about the pole elements of the second stator section. The second magnet section will be so disposed, relative to the second stator section, as to cause the two pole elements of the second stator section to be subjected simultaneously to equal magnetic flux from the second magnet section, values of voltages applied across the second coil thereby being modulated by relative movement of the armature.

DETAILED DESCRIPTION OF THE PREFERRED AND ILLUSTRATED EMBODIMENTS

Figure 1:
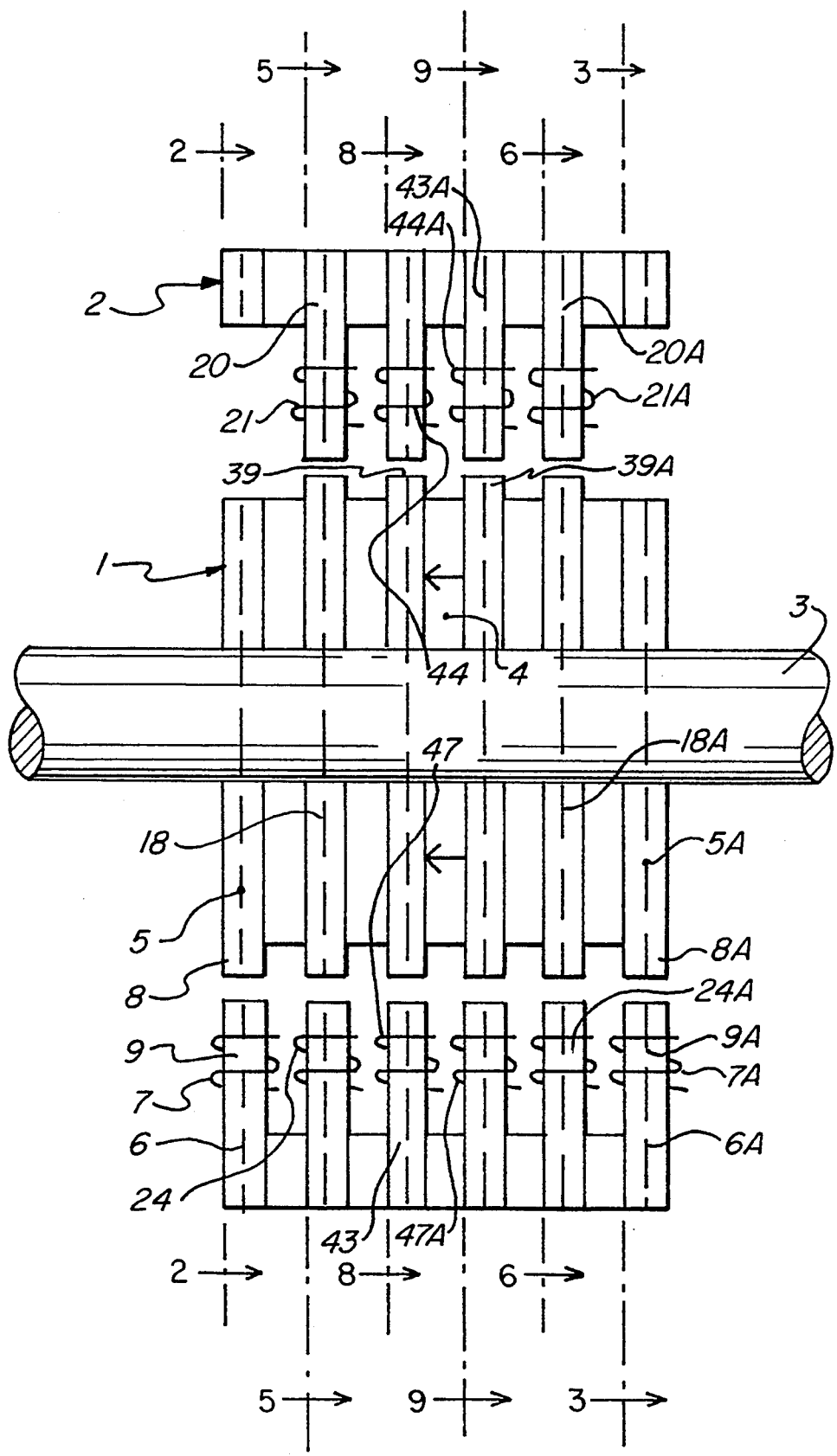
FIG. 1 is a diagrammatic, sectional view of a transducer embodying the present invention, taken along the axis of rotor rotation.
Figure 2:
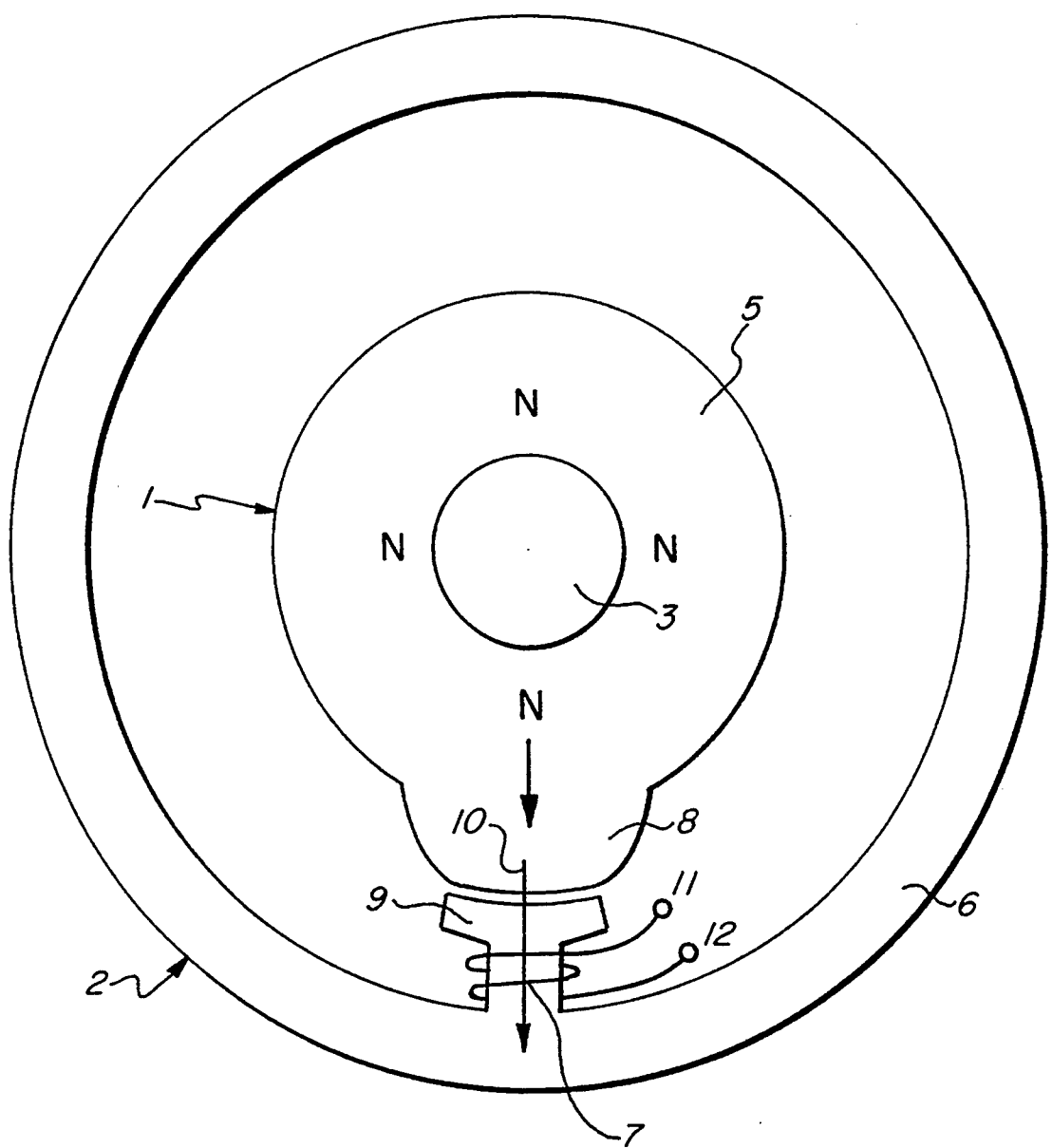
FIG. 2 is a diagrammatic representation of the transducer of FIG. 1, taken along line 2—2 thereof.
Figure 3:
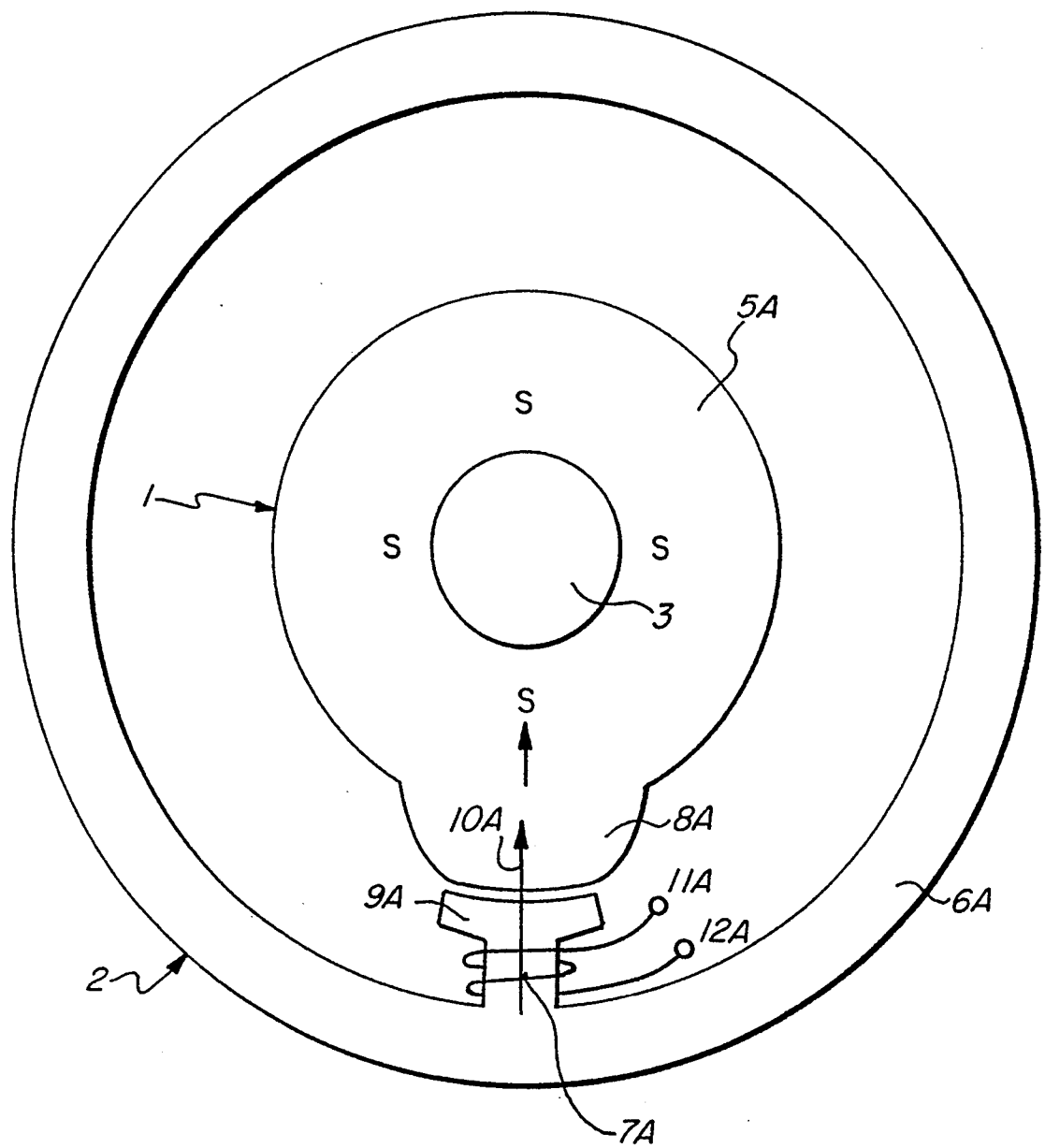
FIG. 3 is a similar view, taken along line 3—3 of the Figure.

A permanent magnet position transducer embodying the present invention is schematically illustrated in FIG. 1 of the drawings, and serves to generate position signals at three different cycle frequencies. The transducer comprises three zones, functioning as a "home sensor," a "commutation sensor," and a "high-resolution sensor." Operation of the commutation and high-resolution sensors relies upon differential reactance and back-EMF balancing to afford high signal quality and fidelity. The home sensor output is controlled by a single reactance variation, and is presently described with further reference to FIGS. 2, 3, and 4 of the drawings.

The transducer comprises a rotor, generally designated by the numeral 1, and a stator generally designated by the numeral 2. The rotor 1 consists of a shaft 3 on which is mounted identical outer lamina or members 5, 5A, the members being made of a ferromagnetic material and each having one pole element or projection 8, 8A thereon, respectively. The stator 2 has two outer members 6, 6A, each having a pole element or protrusion 9, 9A thereon wound with coils 7, 7A, respectively; the winding sense of the coils is the same about both of the pole elements 9, 9A.

As best seen in FIG. 1, the members 5 and 6 lie in a first common plane, and the members 5A and 6A lie in a second common plane parallel to the first and axially spaced from it. A permanent, axially magnetized magnetic element 4 is disposed between the members 5, 5A, and the intervening members (hereinafter described) are also of ferromagnetic material. When the elements 8, 8A of the rotor members 5, 5A register with the elements 9, 9A of the stator members 6, 6A, flux from the magnet 4 flows through the body of member 5, element 8, and element 9, and returns through member 6A, element 9A, element 8A and member 5A. The flux linking coils 7 and 7A therefore varies with a periodicity or cycle of one time per revolution of the rotor 1.

Figure 4:
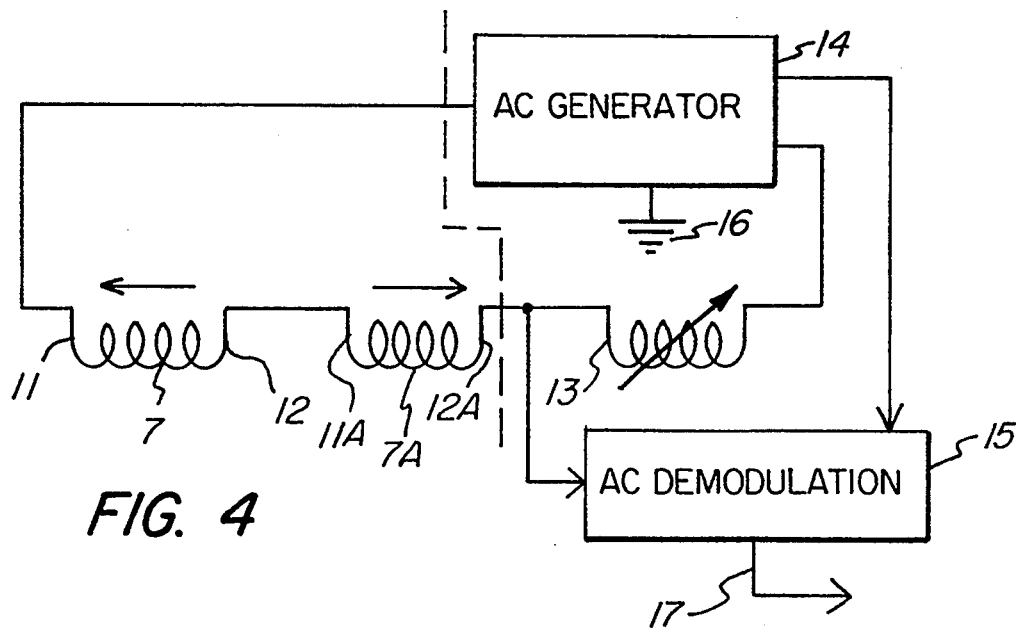
FIG. 4 is a schematic representation of the electrical circuit utilized in the "home" sensor section of the transducer.

Because the flux linking coils 7 and 7A flows in opposite directions through the elements 9 and 9A (as indicated by the arrows 10, 10A in FIGS. 2 and 3), changes in flux density, which occur as a function of rotor rotation, induce voltages in the two coils 7, 7A that are of equal magnitude (dependent upon rotor velocity) but of opposite polarity. By connecting the wire portion 12 of coil 7 to the wire portion 11A of coil 7A, as shown in FIG. 4, the equal magnitude voltages that are induced (back-EMF) by the permanent magnet 4 are oppositely directed (as indicated by the arrows) and therefore cancel one another, thus producing no net back-EMF value in the circuit leg comprised of the two coils.

The reactances of coils 7 and 7A vary as a function of the flux density in pole elements 9 and 9A; i.e., increasing the flux density lowers coil inductance. A high-frequency (typically 10 to 100 KHz) AC voltage source 14, grounded at 16, is connected to wire portion 11 and, by way of a reference reactor 13, to wire portion 12A; a demodulation circuit 15 is connected to the AC generator 14, electrically as well as in a cycle frequency sense.

With the rotor 1 positioned to dispose the element 8, 8A out of registry with the pole elements 9, 9A of the stator 2, the reference reactor 13 is so adjusted as to cause its reactance to approximate the combined reactances of coils 7, 7A. As a result, a zero voltage value is produced on wire portion 12A (and thus at the input to the demodulation circuit 15), as measured with respect to ground. Rotation of the rotor to cause the elements 8, 8A to register with the elements 9, 9A significantly reduces the combined reactances of coils 7, 7A, thereby producing on wire portion 12A an AC voltage having the frequency of the excitation signal received from the generator 14, and having a magnitude proportionate to the reactance reduction.

The demodulation circuit 15 rectifies the resultant AC output so as to produce a DC signal on line 17, which signal is amplified and clipped at the appropriate level to yield one pulse per rotor revolution. Either the leading or trailing edge of the resultant square wave is used to define a precise home position, once per revolution. Although, in the form of transducer described, the home signal is produced by the reactive variance produced in two coils, it will be appreciated that the same effect may be achieved using a multiplicity of coils even or (as will be described hereinbelow) even a single coil.

Figure 7:
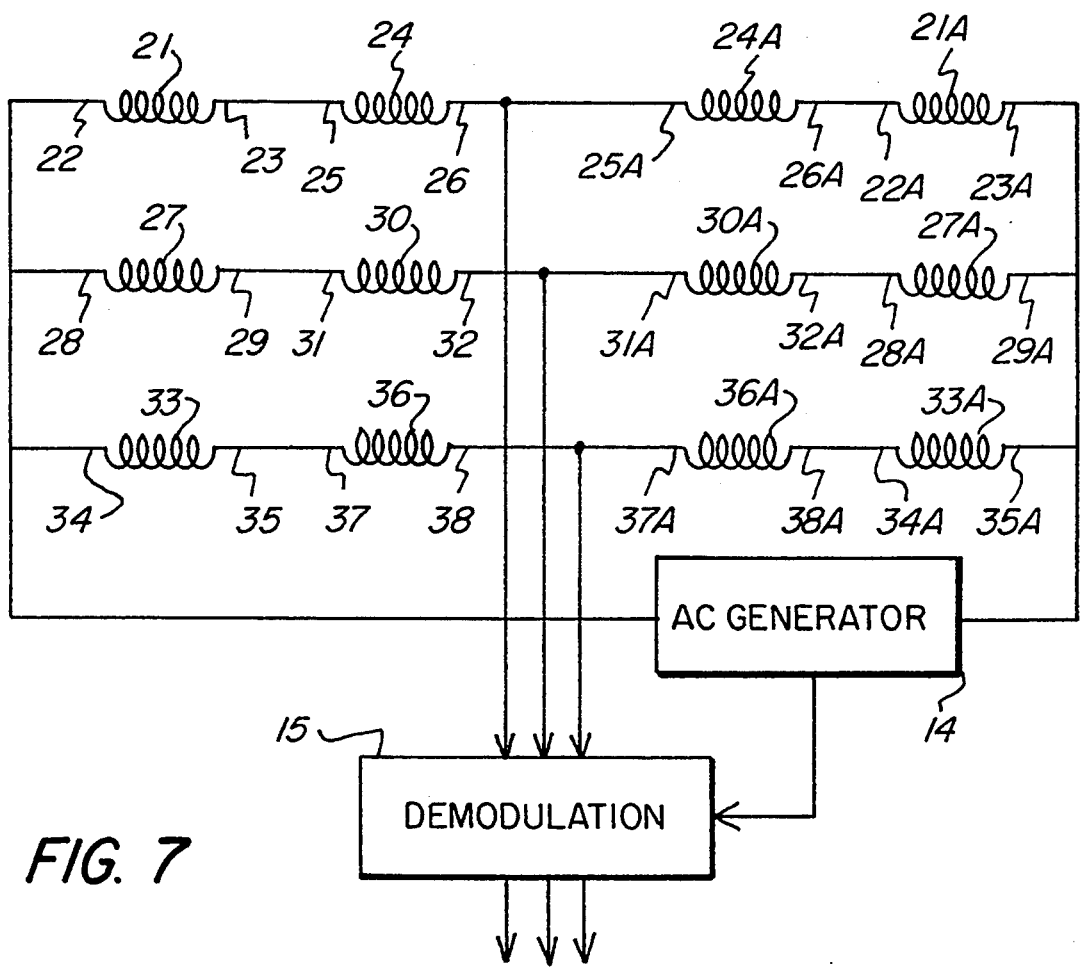
FIG. 7 is a schematic representation of the electrical circuit utilized for the "commutation" sensor section of the transducer.
Figure 5:
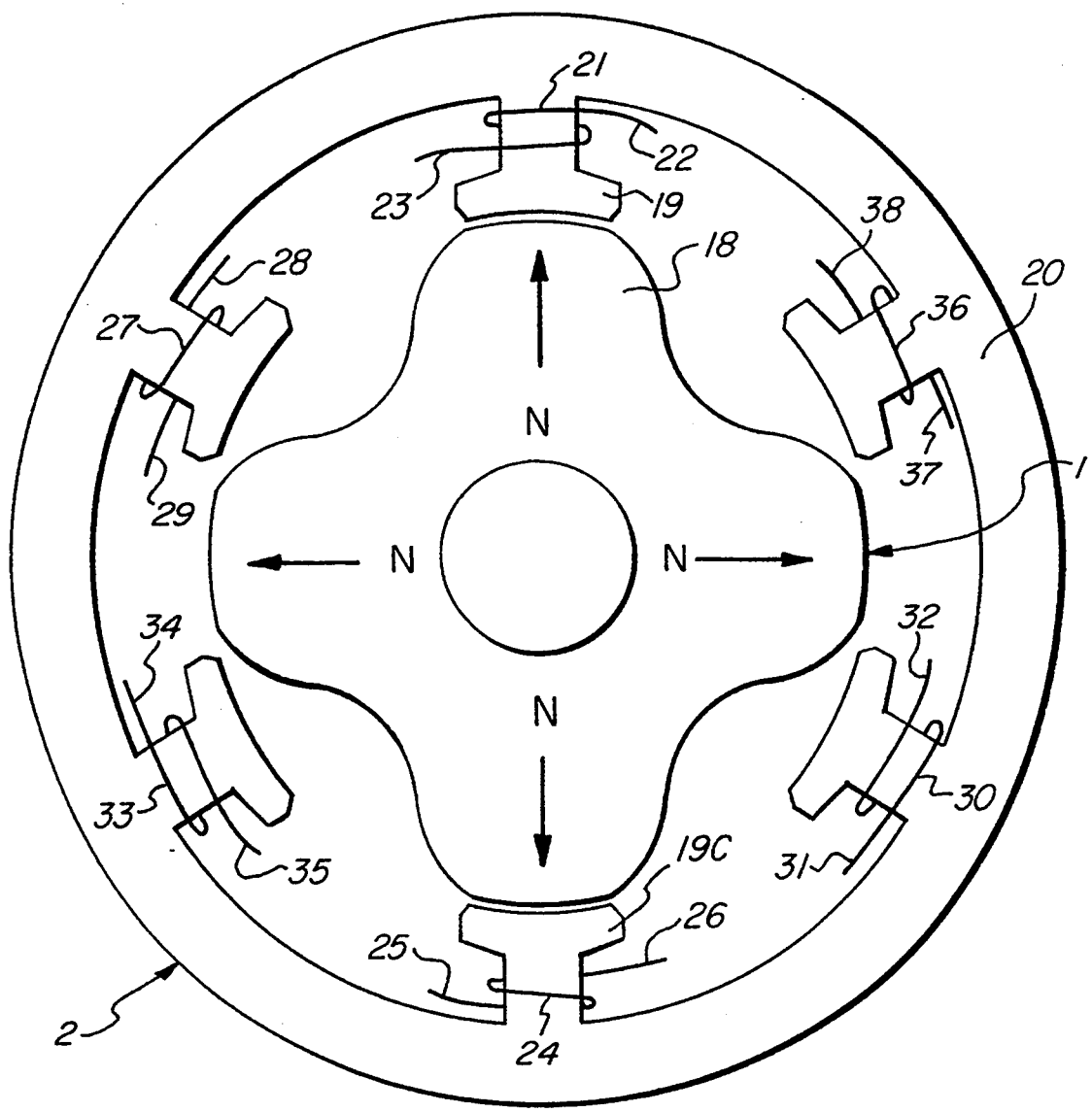
FIG. 5 is a diagrammatic representation of the transducer, taken along line 5—5 of FIG. 1.
Figure 6:
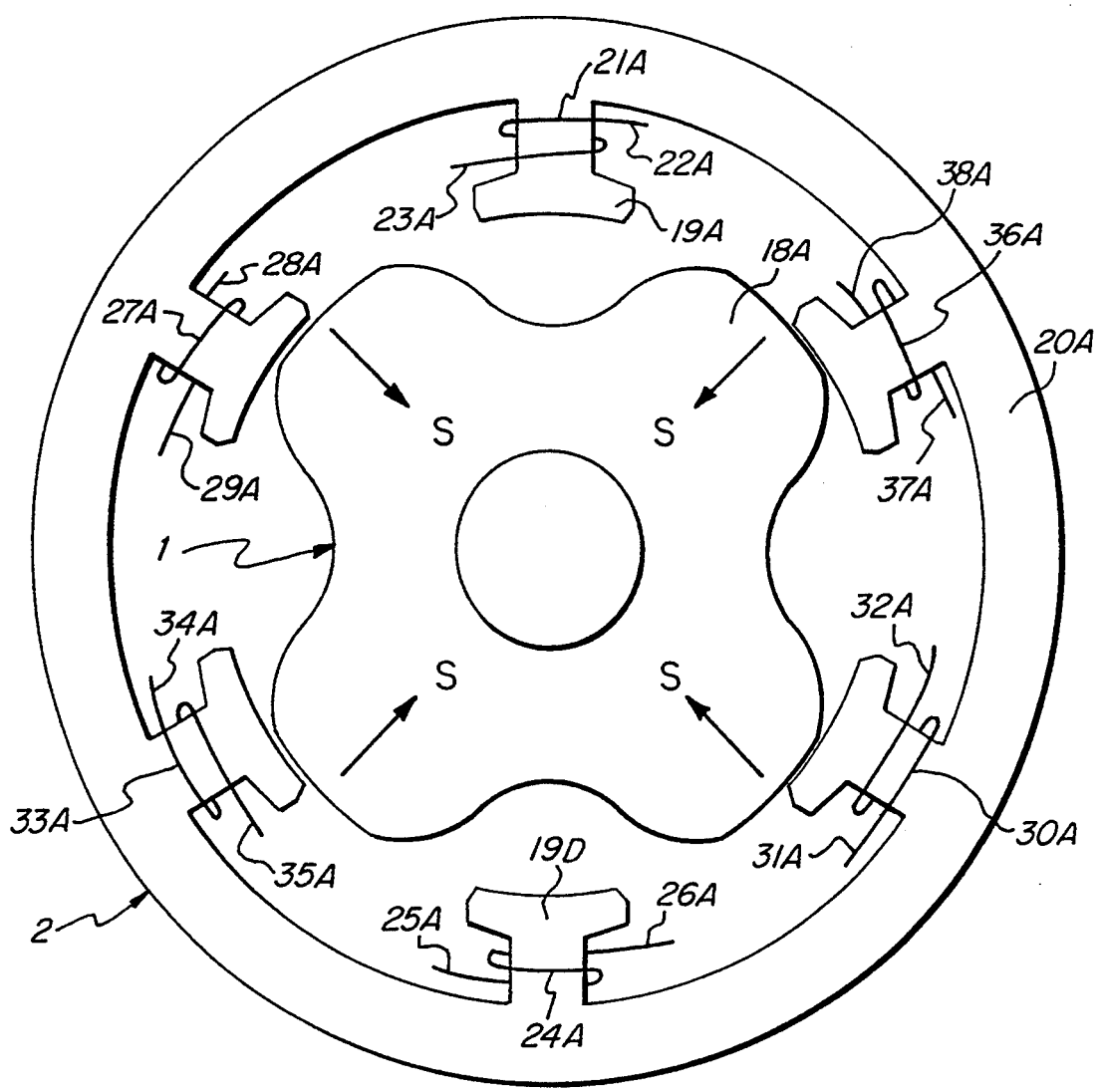
FIG. 6 is a similar view, taken along line 6—6 of the Figure.

With regard now to the commutation zone of the transducer, and with additional reference to FIGS. 5, 6, and 7, it will be seen that the rotor 1 includes two axially spaced ferromagnetic members 18, 18A, each having four lobes angularly spaced at 90° intervals. The corresponding (coplanar) members 20, 20A of the stator 2 are provided with six pole elements equiangularly spaced at 60° intervals, each pole element of member 20 being paired (i.e., longitudinally aligned) with a pole element of member 20A; an electrically conductive coil is wound about each pole element of the stator members. The stator sections thus define three channels, 60° electrical out of phase, each comprised of two diametrically disposed pole elements.

The channels of the commutation sensor are structurally and functionally identical, and thus only one channel need be described. Flux from the permanent magnet 4 flows through rotor member 18 and stator pole 19 on member 20, returning by way of pole 19A on member 20A and rotor member 18A; flux of the same strength and polarity simultaneously flows along a like path through diametric pole elements 19C and 19D. Because the winding sense of coils 24 and 24A is opposite to that of coils 21 and 21A, the permanent magnet voltage induced in coil 24 is equal in magnitude and opposite in polarity to the voltage induced in coil 21. Consequently, connecting wire portion 23 of coil 21 to wire portion 25 of coil 24 (as illustrated in FIG. 7) causes mutual cancellation of the induced back-EMF, as measured on wire portions 22 and 26; coils 24A and 21A are similarly connected to one another, to the same effect.

As is also shown in FIG. 7, wire portions 26 and 25A are joined, and portions 22 and 23A are connected to an AC voltage supply 14. The transducer construction, and of the previously described mechanical relationships that exist between the stator and the rotor members, cause the combined reactance of coils 21 and 24 to be at a minimum in the rotor orientation depicted, because they are linked by a maximum level of permanent magnetic flux, whereas the combined reactance of coils 21A and 24A is at a maximum because they are minimally linked; maximum AC voltage therefore appears at the juncture of wire portions 26 and 25A. It will be appreciated that displacement of the rotor by 22.5° mechanical from the position shown will cause a zero voltage to appear at the same junction. The demodulation circuit 15 rectifies the AC signal, and generates a DC output having a sine wave function at a frequency of four cycles per rotation of the rotor.

The other two channels of the commutation sensor are similarly formed and connected, as shown in FIGS. 5–7, and need not therefore be discussed in detail; it will be appreciated however that they are shifted 60° electrical and 120° electrical, respectively, from the channel described. Rather than constructing the transducer in the mechanical form shown, the rotor members could of course be aligned with one another, with the stator members offset by 45° mechanical, or the stator portions could be offset (for example) by 30° from one another with the: rotor members offset by 15° leading again to a total angular offset of 45° mechanical.

Figure 8:
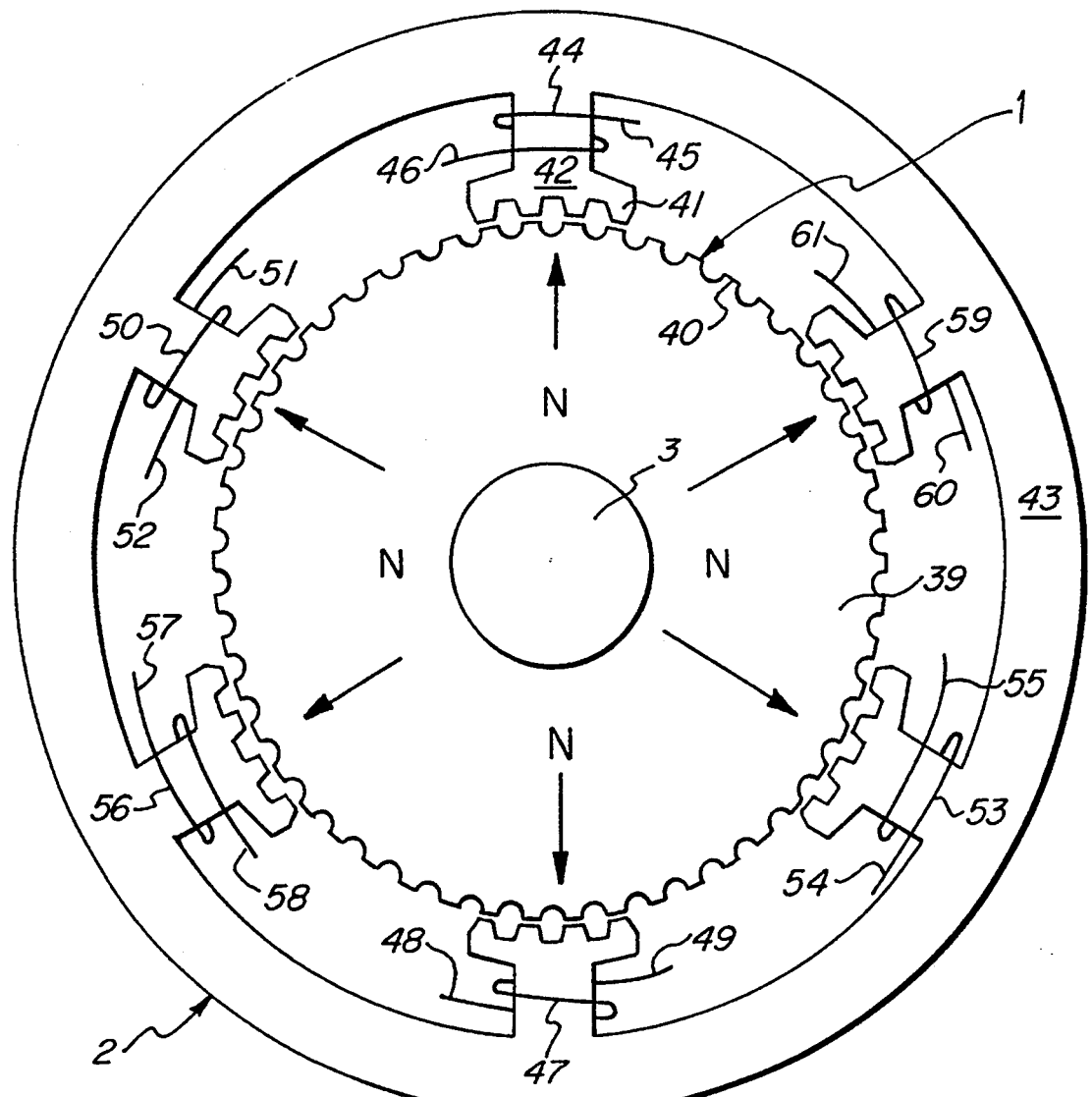
FIG. 8 is a diagrammatic representation of the transducer, taken along line 8—8 of FIG. 1.
Figure 9:
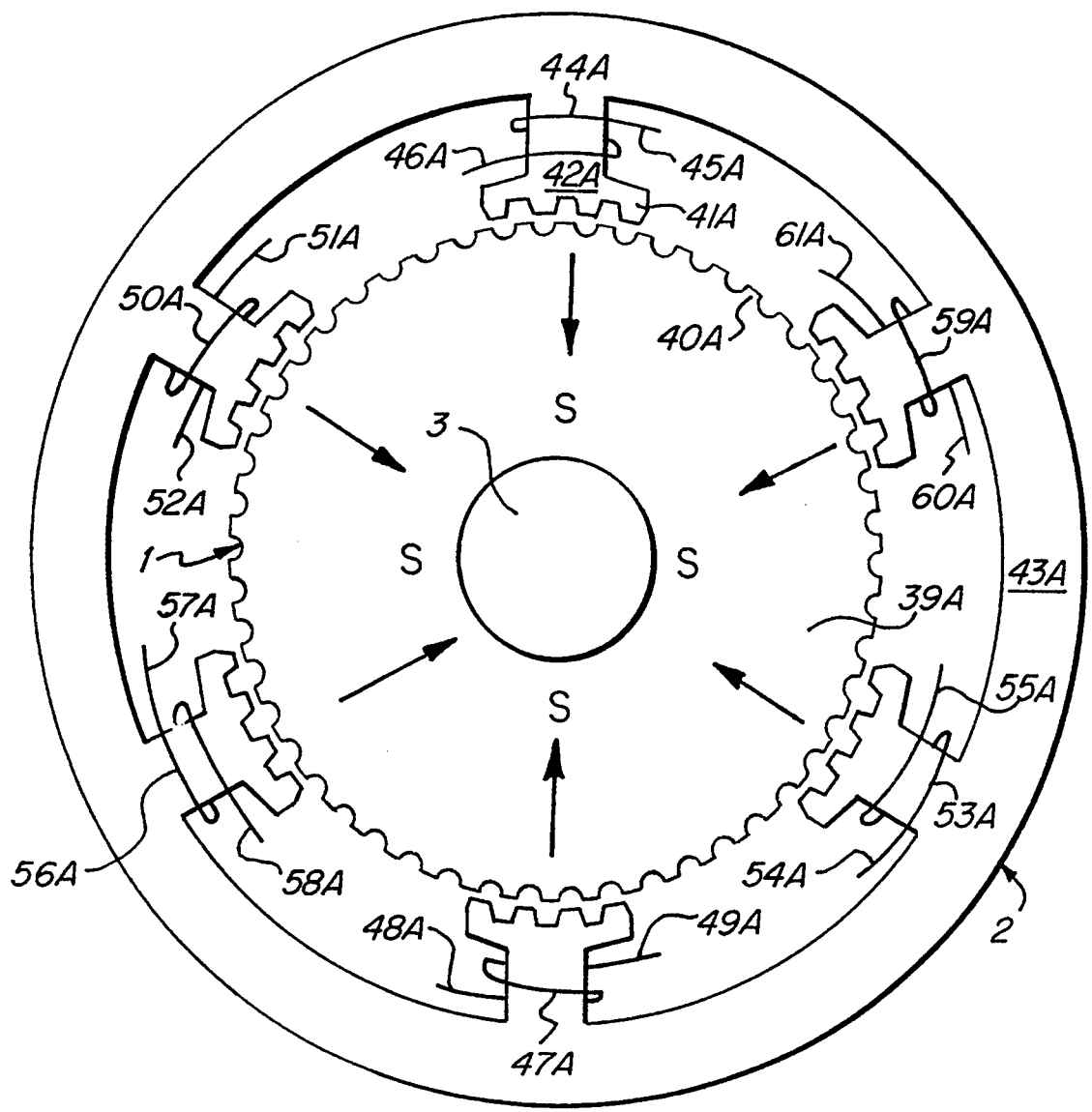
FIG. 9 is a similar representation, taken along line 9—9 of FIG. 1.
Figure 10:
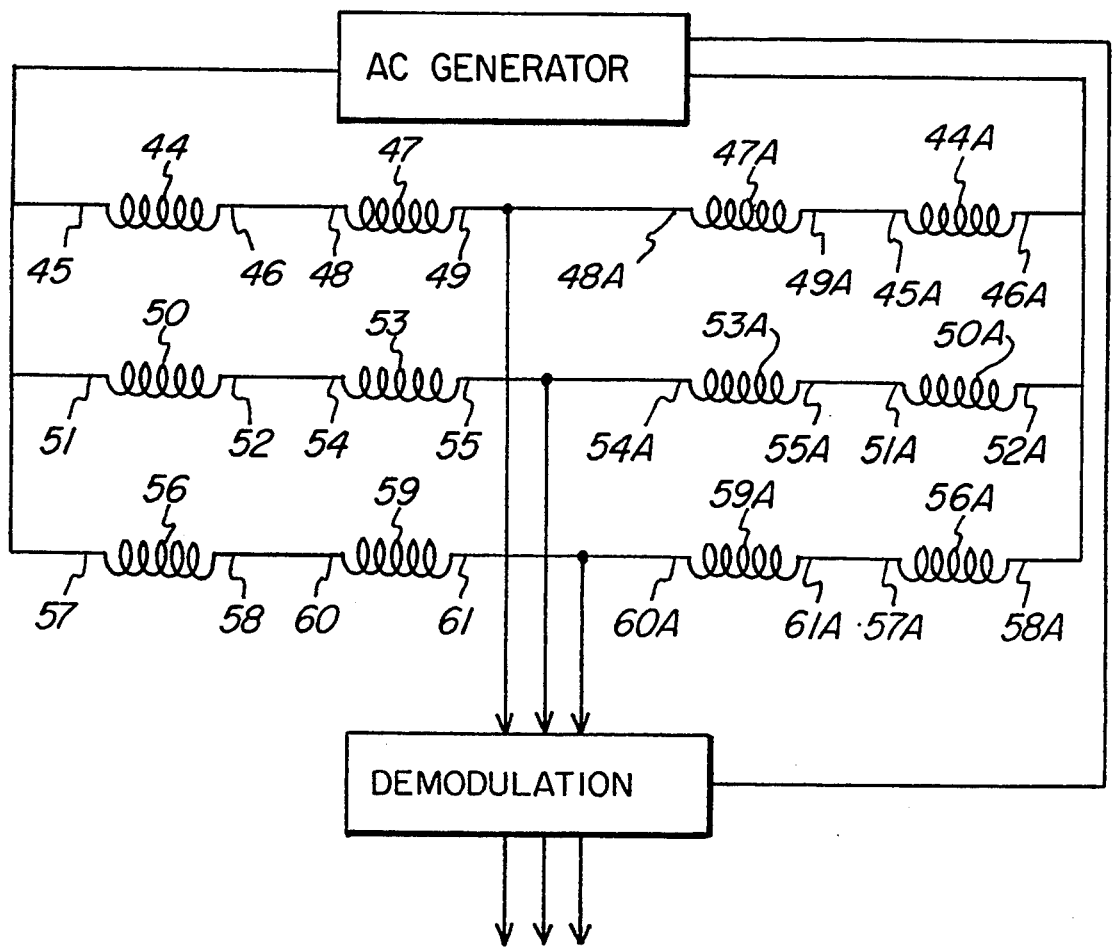
FIG. 10 is a schematic representation of the electrical circuit utilized for the high-resolution sensor section of the transducer of the foregoing Figures.

The high-resolution zone of the transducer is more specifically shown in FIGS. 8, 9 and 10, from which it will be noted that the stator section coils are electrically paired in the same manner as in the commutation zone, so as to produce no net, flux-induced back-EMF effects. Each of the axially spaced rotor members 39, 39A has 50 teeth 40 equiangularly spaced about its circumference, the teeth of the two members being mutually offset from axial alignment by one-half pitch (i.e., 3.6°). Each of the pole elements (e.g., 42, 42A) of the associated stator members 43, 43A has four teeth, disposed with the same pitch as the teeth on the rotor members 39, 39A and axially aligned with one another (i.e., as between the members 43 and 43A).

Flux from the permanent magnet 4 links rotor member 39, rotor teeth 40, stator teeth 41, pole elements 42, and stator member 43, and returns by way of stator member 43A, pole elements 42A, stator teeth 41A, rotor teeth 40, and rotor member 39. As will be appreciated, flux linkage will be high when the teeth 41 and 40 are aligned, and low when teeth 41A and 40A are maximally misaligned. This of course periodically modulates the flux density in stator pole elements 42, 42A when the rotor 1 is rotated, resulting in corresponding reactance variation in coils 44 and 47 and 44A and 47A, respectively, at a cycle frequency determined by the number of rotor teeth. Here again, and as can be seen in FIG. 10, the coils of the high-resolution stator section comprise three channels (7.2° mechanical out of phase), and are so connected that back-EMF effects induced on paired coils (e.g., 44 and 47, and 44A and 47A) cancel one another; output signals from the demodulation circuit are the result of differential reactances, and are highly sinusoidal.

It will be appreciated that the three-phase signal could, if so desired, be converted internally of the device to a sine and cosine format by joining wire portions 49 and 48A, and 55 and 54A, so as to form one input to the demodulation circuit. Such a format enables elimination of one electronic interface wire, and thereby enhances economy of scale since the stator sections for high-resolution and commutation zones could be fabricated with substantially the same manufacturing equipment; moreover, the total pole count of the sensors would enable substantial averaging of mechanical and magnetic parameters.

In the embodiment hereinafter described, which is presently believed to represent the best mode for carrying out the invention, the coil count is minimized while the capability of differential reactance measurements (in the high-resolution and commutation sections) is maintained. This is achieved by so constructing the transducer that modulated permanent magnetic flux links a single coil, producing no net back-EMF effect in that coil while producing a reactance that varies as a function of flux density.

Figure 11:
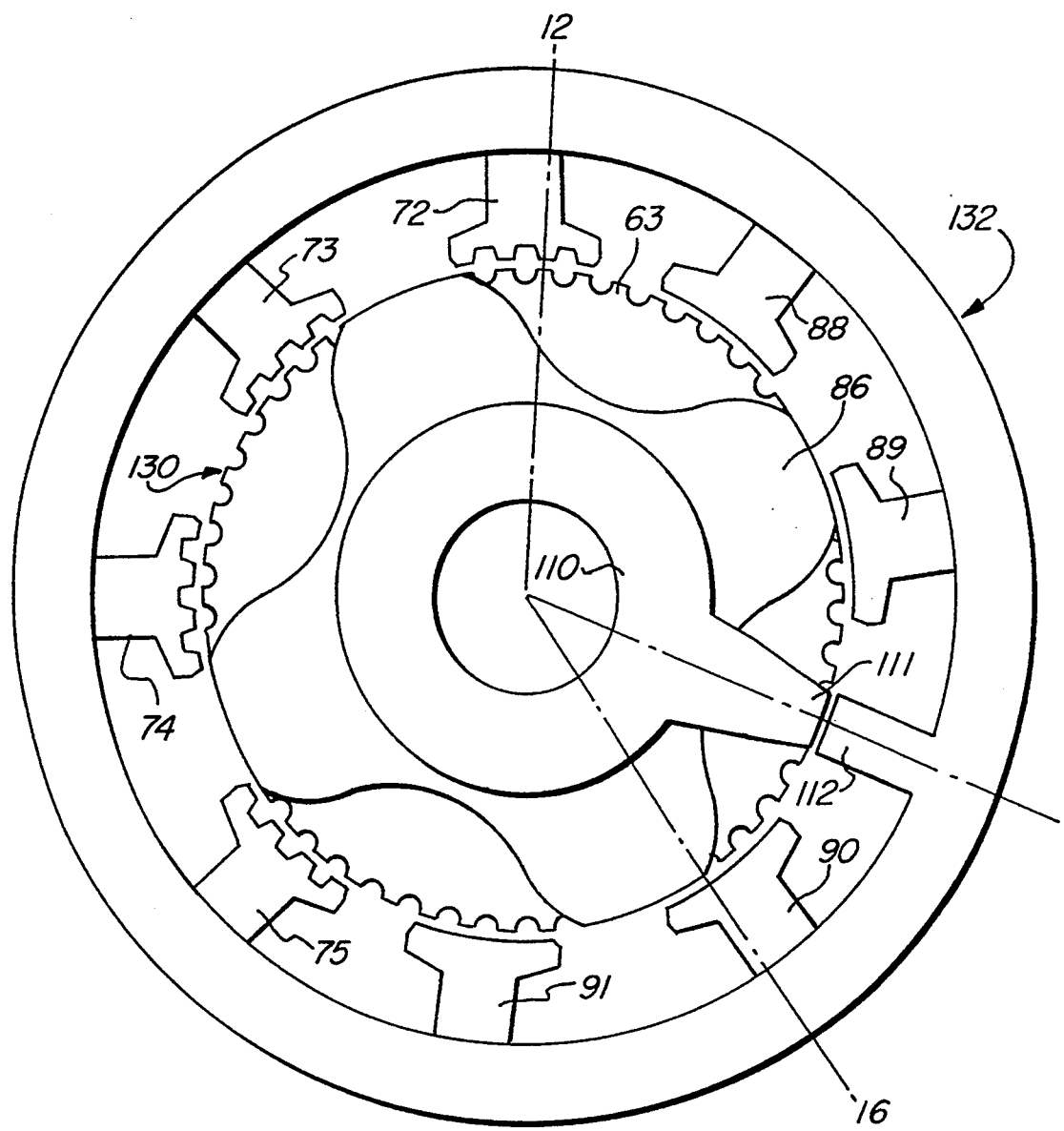
FIG. 11 is a transaxial, diagrammatic representation of a second form of transducer embodying the present invention, taken from one end.

Such a transducer (including however no coils) is schematically illustrated in FIG. 11 and includes a rotor generally designated by the numeral 130 and a stator generally designated by the numeral 132. The rotor comprises a pair of axially spaced, single-pole home section members 111, 111A, a pair of four-lobe commutation section members 86, 86A, and a pair of high-resolution section members 63, 63A, the latter having 50 teeth formed about their circumferences. The stator is correspondingly constructed to define (in coplanar relationships to the coacting rotor members) a pair single pole element home section members 112, 112A, a pair of four pole element commutation members 92, 92A, and a pair of four pole element high resolution members 65, 65A. It will be appreciated that only one of each pair of rotor members, stator members, and pole elements is visible in FIG. 11, the cooperating members and elements being axially spaced and aligned in a manner similar to that of the transducer embodiment first described.

Figure 12:
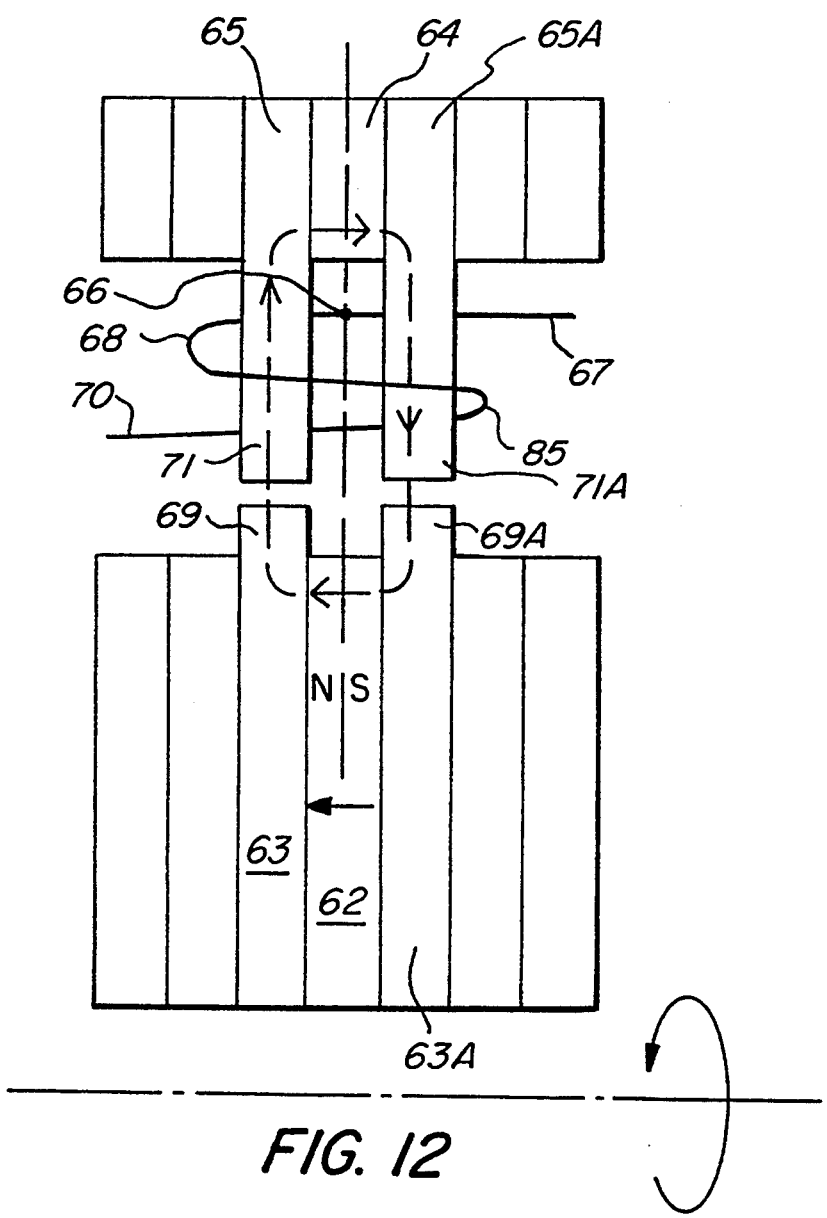
FIG. 12 is a diagrammatic representation of the transducer of FIG. 11, taken along line 0-12 thereof.
Figure 13:
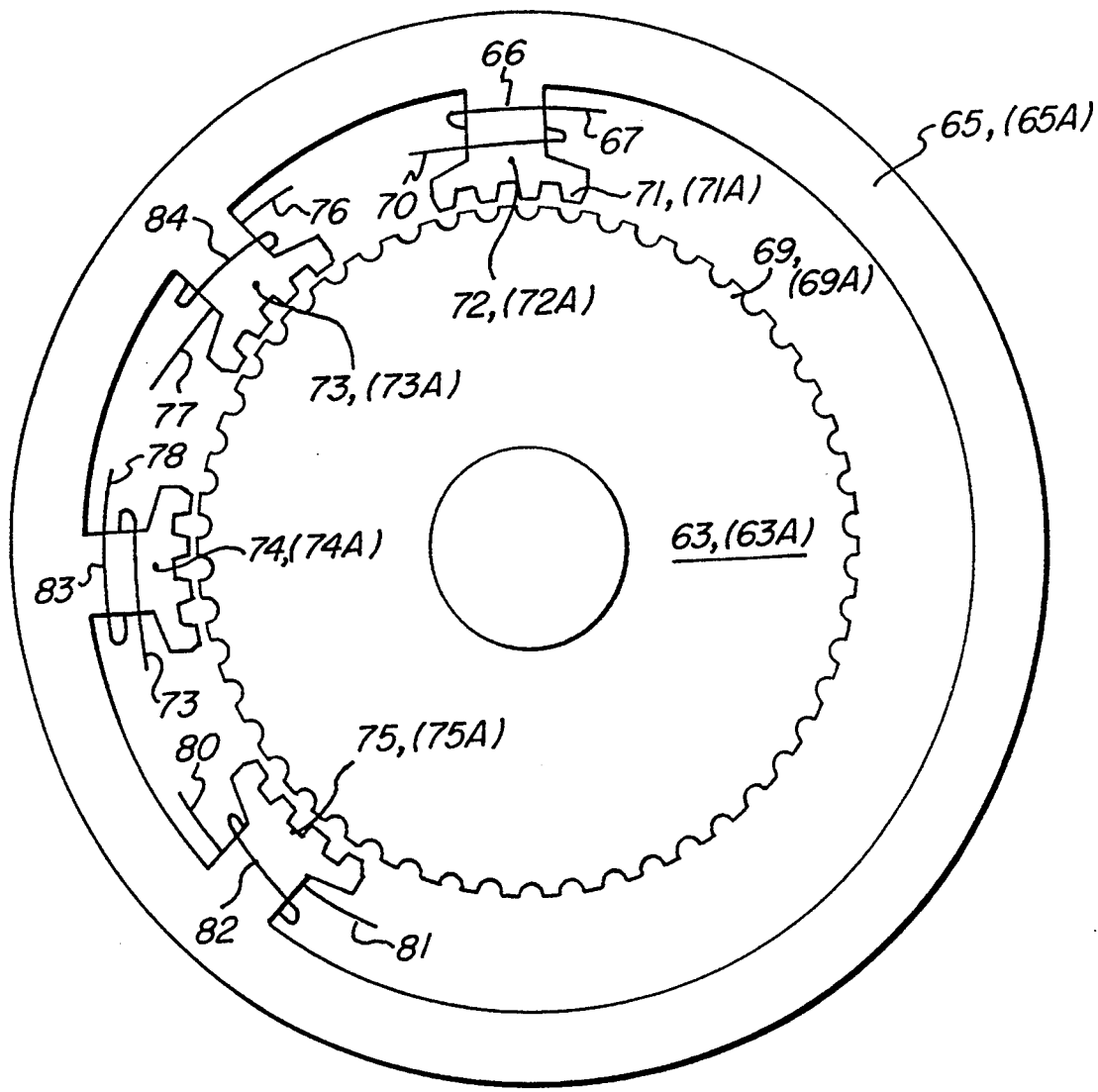
FIG. 13 is a transaxial, diagrammatic representation showing one of the coplanar rotor and stator sections comprising the "high-resolution" sensor zone of the transducer of FIG. 11.

The magnetic flux path established in the high-resolution section of the transducer is depicted in FIGS. 12 and 13 (because the stator lamina and their features are identical, it will be noted that double numbers, one of each pair being in parentheses, are used in FIG. 13). The axially polarized permanent magnet 62 establishes a flux that links rotor member 63 through the teeth 69 thereon with stator teeth 71 on the pole elements 72, 73, 74 and 75 of laminations 65, returning through ring lamination 64 and pole lamination 65A by way of pole elements 72A, 73A, 74A, 75A, teeth 71A and 69A, and rotor lamination 63A. The intensity of permanent magnet flux in the stator poles is modulated by the rotor teeth and stator teeth as they rotate relative to one another (rotor rotation being indicated by the curve arrow). The resultant variation of flux induces a voltage in the coil portion 68 on the stator pole elements 72, 72A, while simultaneously inducing a voltage of equal magnitude in the coil portion 85. Because the flux is (as shown by the arrow pattern in FIG. 12) moving in opposite directions through the two coil portions 68, 85, the induced voltages are of opposite polarity, cancelling one another and producing zero net back-EMF across the coil 66; this is of course so irrespective of rotor rotation velocity. It will be understood that the above-described construction is employed to achieve a balancing of back-EMF effects in all coils of the present embodiment of the transducer.

The reactance value (ohmic and inductive resistance) of coil 66 is determined by the magnetic flux density passing through pole elements 72 and 72A, and therefore varies as a function of modulation frequency and rotor position. A differential reactance sensor is formed in the high-resolution zone by connecting two coils that have reactances 180° electrical out of phase. Connecting the coils 66 and 83 in the manner depicted in FIG. 14 will therefore produce an AC voltage at the junction of wire portions 70, 78 (and the input to the demodulation circuit 15) that is determined by the reactance differential in coils 66 and 83. In the relationship illustrated in FIG. 13, the reactance of coil 83 is low since the teeth of the rotor member align with the teeth of the stator pole elements 74, 74A on which it is wound, producing a high flux density, and conversely the reactance of coil 66 is high since the teeth are maximally misaligned and the flux density in poles 72, 72A is low; thus, a high voltage will appear at the 70/78 junction. This AC input is rectified in the demodulation circuit, and is converted to a DC voltage having a magnitude that varies as a function of the differential reactance and a cycle frequency that depends upon the number of rotor teeth; the signal is highly sinusoidal with respect to rotor position. A cosine signal is similarly formed from the voltages on coils 84 and 82, the reactances of which are shifted 90° electrical from those of coils 66 and 83, respectively.

Figure 14:
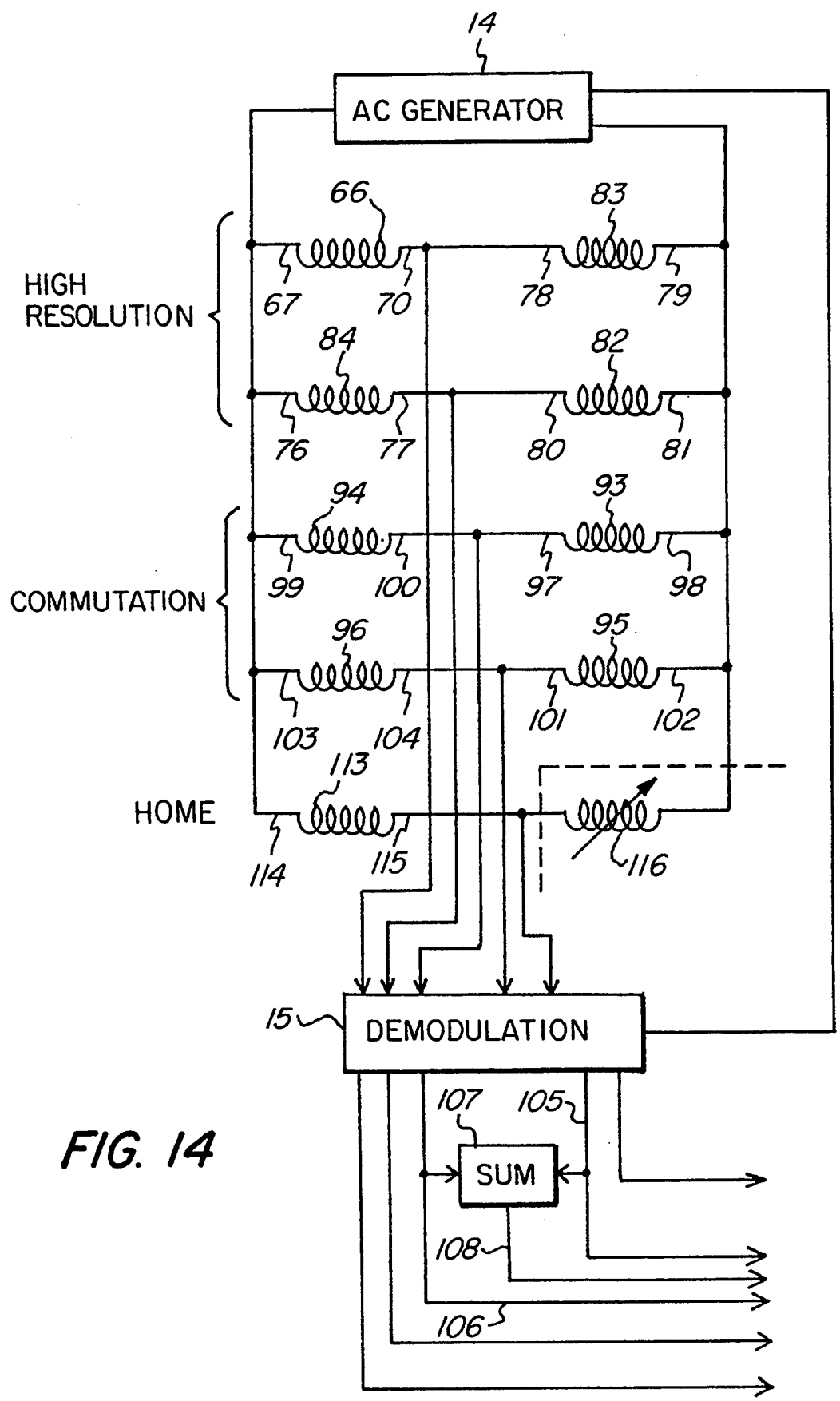
FIG. 14 is a schematic representation of circuitry for the three sensor zones of the transducer of FIG. 11.
Figure 15:
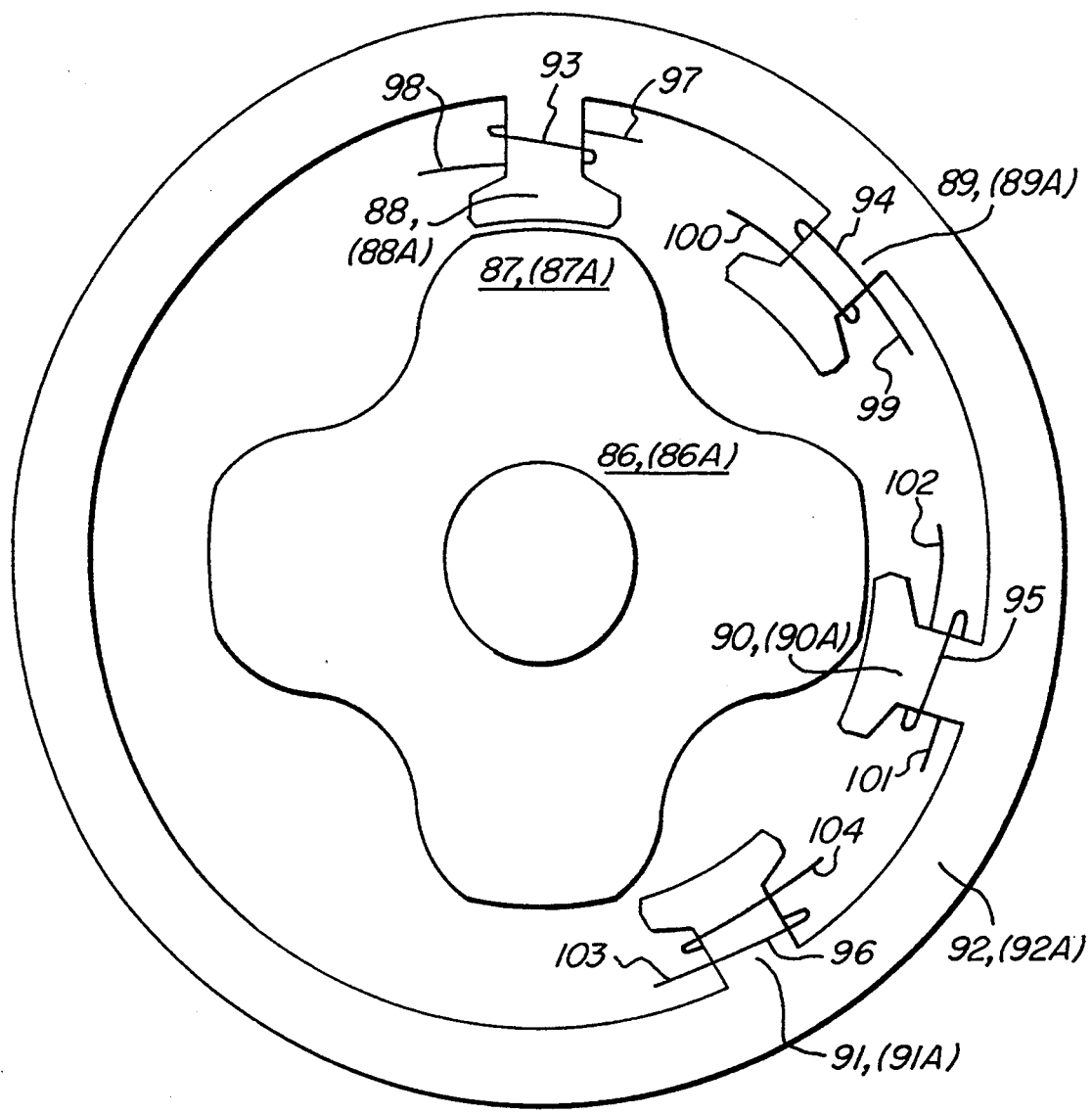
FIG. 15 is a transaxial, diagrammatic representation of one of the coplanar rotor and stator sections comprising the "commutation" sensor zone of the transducer of FIG. 11.
Figure 16:
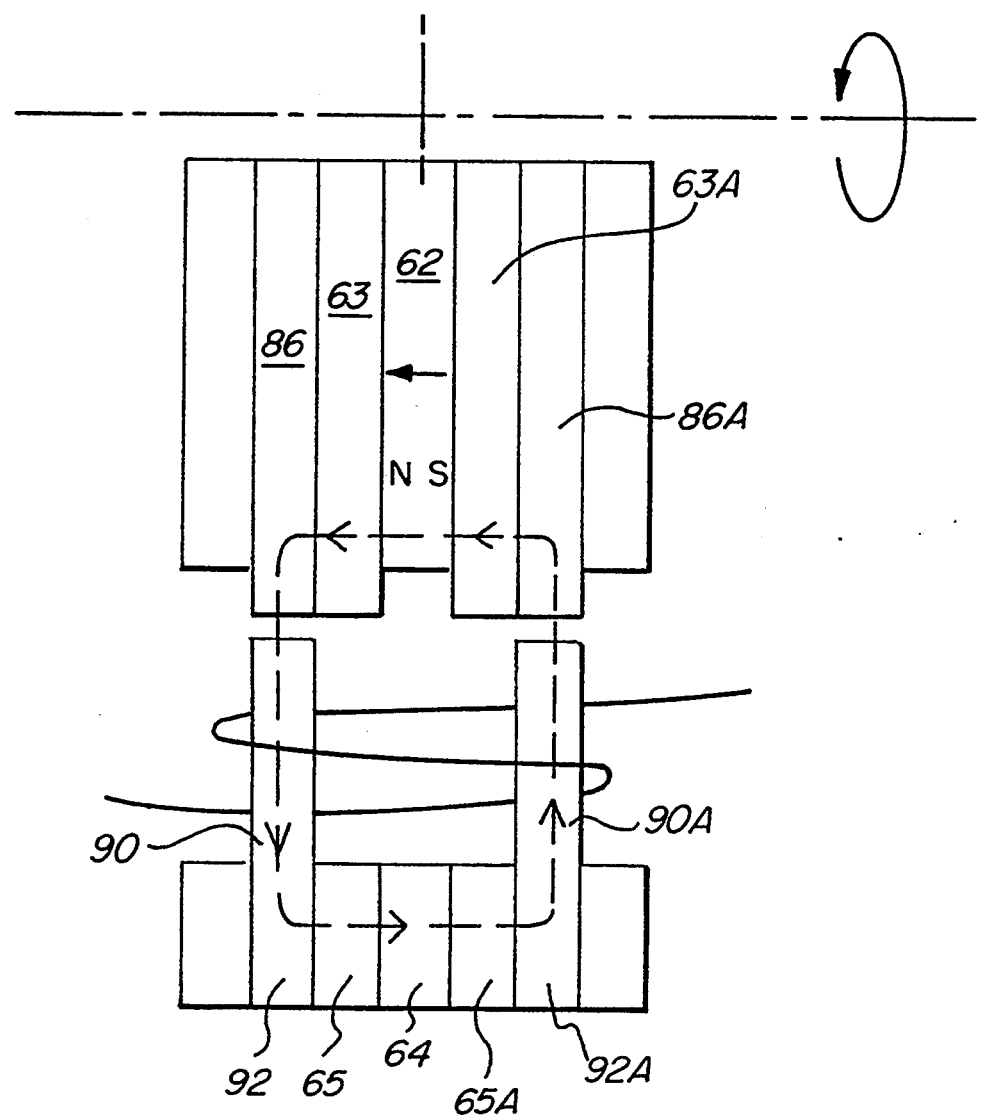
FIG. 16 is a diagrammatic representation taken along line 0-16 of FIG. 11.

The commutation zone of the instant embodiment is more specifically illustrated in FIGS. 15 and 16. Here again, the paired rotor members 86, 86A have four lobes 87, 87A, which serve to modulate flux density in stator pole elements 88, 88A and thus to establish an electrical cycle frequency of four per revolution. Coil 93 is back-EMF balanced in the manner previously described, and as illustrated in FIG. 16. One of two output channels is formed by coils 93 and 94, having a maximum reactance differential in the position depicted in FIG. 15. A second commutation channel is comprised of the coils 95 and 96, producing a phase shift of 120° electrical with respect to the first channel. With the coils connected as shown in FIG. 14, reactance differentials are generated that vary in a highly sinusoidal manner, as a function of rotor position. A sine signal is produced on line 106 and a sine plus 120° electrical signal is produced on line 105; they are electrically summed by a suitable component 107 to produce a sine plus 60° electrical signal on line 108. The three resultant channels may be used to control the commutation of a brushless DC or AC servomotor, either directly or indirectly by digital means.

Figure 17:
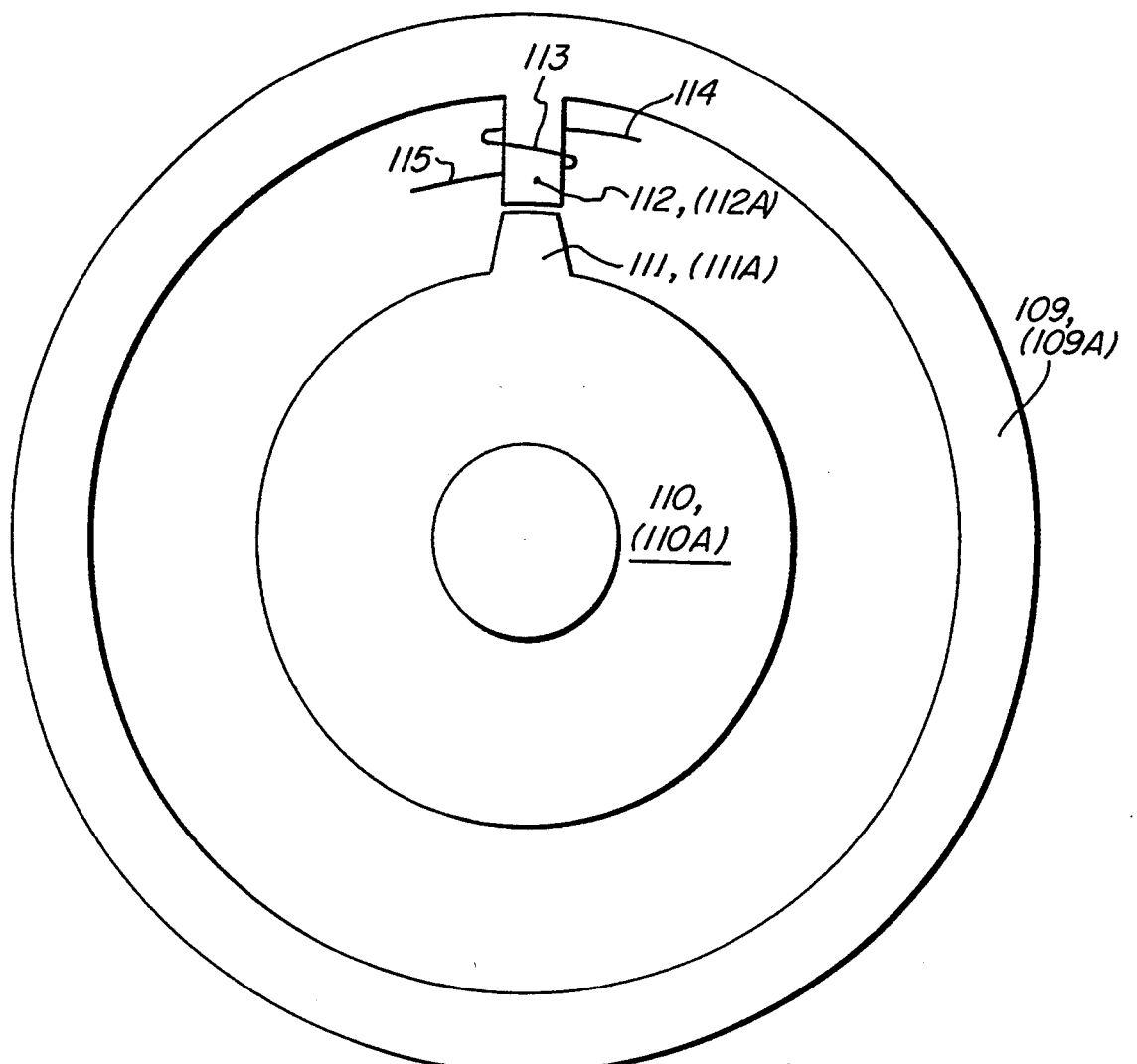
FIG. 17 is a transaxial, diagrammatic representation showing one of the coplanar rotor and stator sections comprising the "home" sensor zone of the transducer of FIG. 11.
Figure 18:
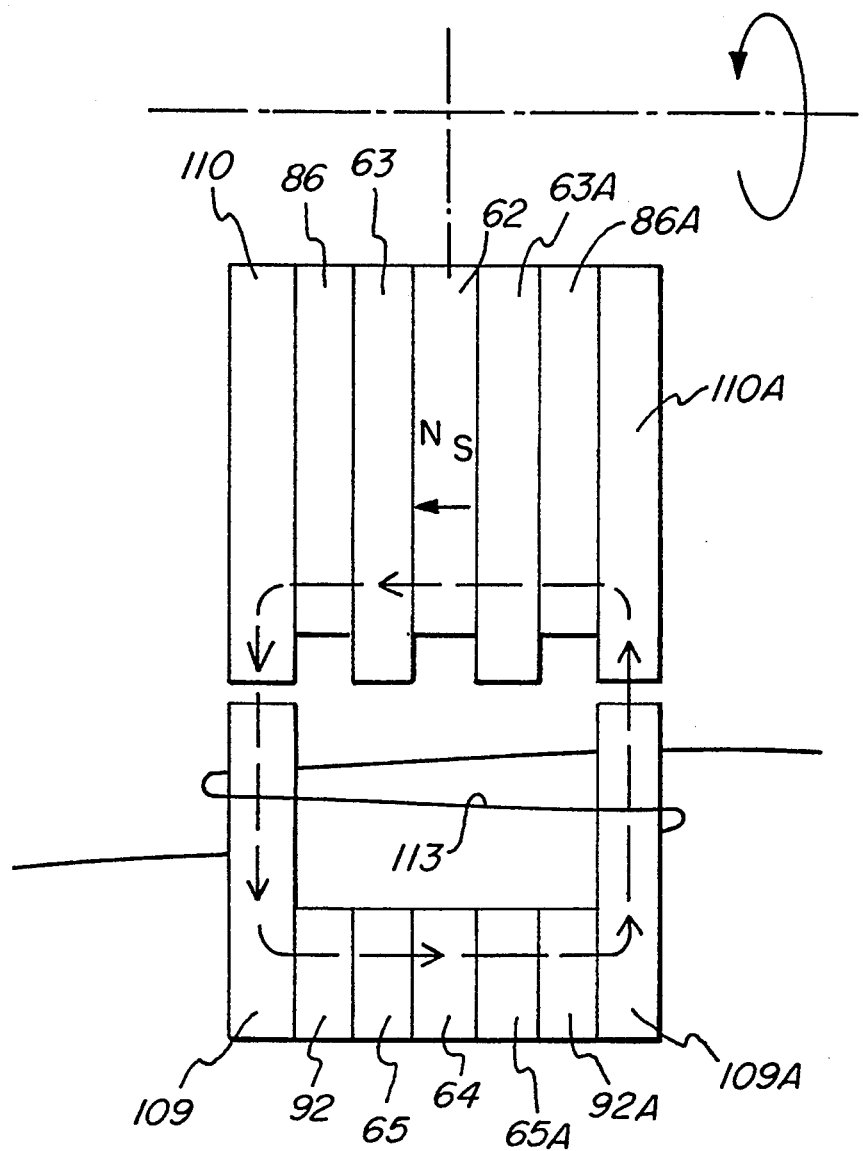
FIG. 18 is a transaxial, diagrammatic representation taken along line 0-18 of FIG. 11.

The home sensor of the transducer is illustrated in FIGS. 17 and 18. Here again, this zone serves to generate a one-time per revolution, single channel nonsinusoidal signal, which is used to reference motor or machine position upon system start-up; the signal is highly repetitive, and has a low hysteresis character.

As will be appreciated, permanent magnet flux links rotor member 110, rotor pole element 111, stator pole element 112, and lamination 109, and returns by way of lamination 109A, pole elements 111A and 112A, and rotor member 110A. The reactance of coil 113 is at its minimum when poles 111 and 111A, and 112 and 112A, respectively, register with one another. As shown in FIG. 14, wire portion 115 of coil 113 is connected to one terminal of the adjustable reference reactor 116, with a line from the junction providing an input to the demodulation circuit 15. The excitation voltage from the AC generator 14 is connected as shown, and permanent magnet flux and velocity induced voltages are cancelled internally of the coil 113, in the manner previously described.

It will be evident to those skilled in the art that rotors having a multiplicity of radially disposed permanent magnets can be substituted for the axially magnetized rotors employed in the transducers described, to afford certain advantages. Thus, the phrase "permament magnet pole element" is used herein to refer to such individual magnets as well as to elements on magnet ferromagnetic members, as illustrated. On the other hand, because of the lack of reliable homogeneity of magnet masses, and the resultant nonuniformity of energy produced, it might be found that measurement errors occur.

Figure 19A:
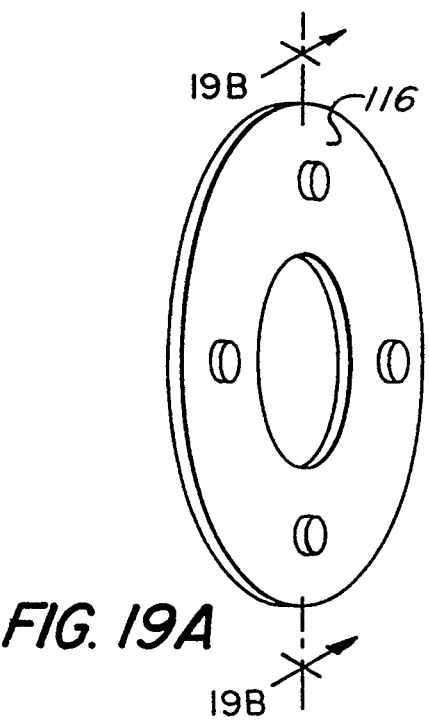
FIGS. 19A, 19B and 19C are, respectively, perspective and sectional views of a motor lamination having dimpled elements for alignment and assembly, and of an assembled array of such laminations.
Figure 19B:
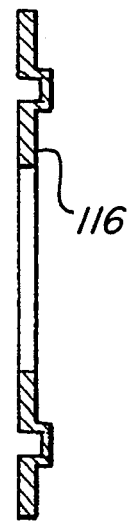
Figure 19C:
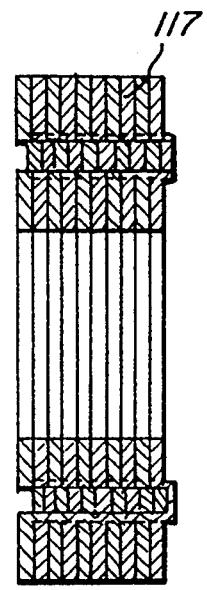
Figure 20:
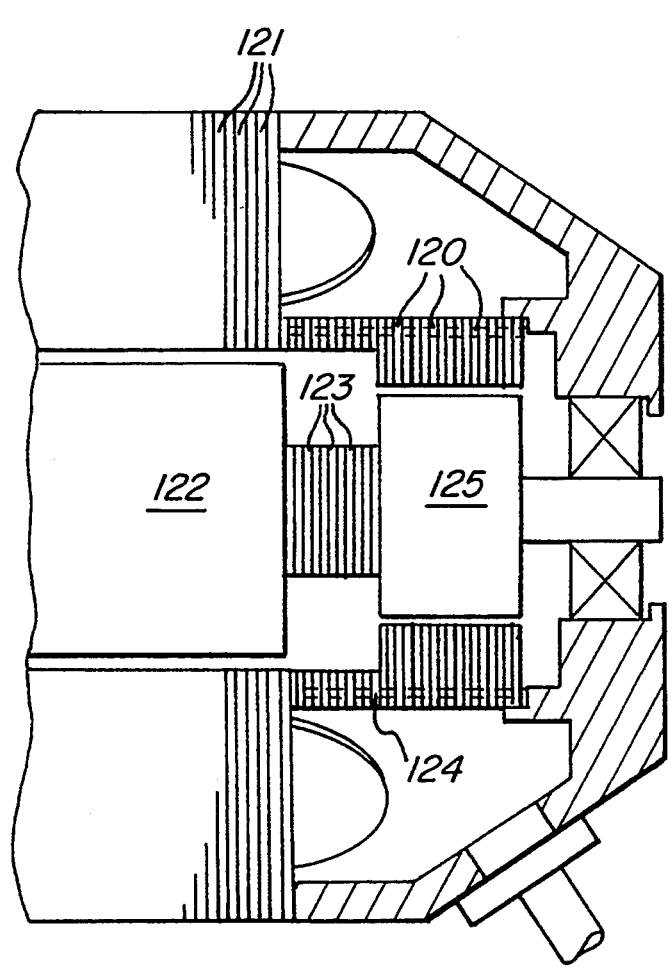
FIG. 20 is a diagrammatic sectional view showing a motor and a transducer embodying the present invention, in which dimpled laminations are employed for alignment and assembly.
Figure 21:
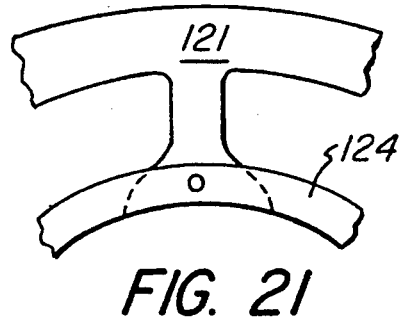
FIG. 21 is a fragmentary elevational view of two assembled laminations employed in the motor of FIG. 20.

Dimpled laminations, such as may take the form of the annular member 116 shown in FIGS. 19A and 19B (the latter being taken along line 19B—19B), have previously been employed to provide mechanical lamination alignment and interlocking, so as to produce an assembly of the nature shown in FIG. 19C. An especially beneficial form of the transducer of the instant invention employs similar structure, as illustrated in FIGS. 20 and 21.

Thus, dimpled magnetic and nonmagnetic laminations, 123 and 124, respectively, are utilized between motor and transducer parts 122 and 125, and between motor and transducer parts 121 and 120, as well as for stacking of the transducer laminae 120 with one another. As far as is known, sensor parts have not heretofore been assembled with one another in such a manner, nor has such structure been used to construct a motor-transducer combination; the technique uniquely enables alignment and assembly of such disparate components in a manner that is economical and highly effective.

Thus, it can be seen that the present invention provides a novel differential reactance, permanent magnet transducer that exhibits outstanding performance characteristics. Output from the transducer is highly sinusoidal and low in harmonic and hysteresis content, thus making it very accurate, and the transducer is highly immune to hostile environmental conditions such as temperature, vacuum, radiation, vibration and magnetic disturbance fields, thus making it well-suited for use in close proximity to magnetic motor structures. The invention also provides a permanent magnet transducer having a plurality of sensors, at least one of which generates differential reactance signals for position determination. The transducer may, more specifically, have three sensor sections, two of which rely upon differential reactances and constitute a high-resolution sensor and a commutation sensor, and the third functioning to indicate a home position.

Having thus described the invention, what is claimed is:

1. A differential reactance permanent magnet transducer comprising a stator and an armature, said stator having a first section with at least two pole elements thereon of ferromagnetic material, each stator pole element having an electrically conductive coil wound thereabout, and said armature having a first magnet section with at least one permanent magnet pole element thereon, said pole elements being so disposed as to cause said magnet pole element to register sequentially with said pole elements of said first section of said stator as said armature moves relative to said stator, and being so disposed that the flux density variation produced in one of said stator pole elements by movement of said magnet pole element relative thereto varies in an out-of-phase relationship to the flux density variation produced in the other of said stator pole elements by such magnet pole element movement, said coils being comprised of effectively equal numbers of turns and being connected in series to provide at least one circuit having terminals to enable the application of voltages thereacross and to enable measurement of voltage values at a junction between said coils thereof, each coil comprising a leg of said one circuit, whereby said first stator section, said first magnet section, and said coils provide a first sensor section, and whereby the values of voltages applied across said circuit will be so modulated by such relative movement of said armature as to enable the generation of signals from said first sensor section that vary sinusoidally as a function of armature position and reactance variation in said coils, the electrical and mechanical features of said transducer being such that no net back-EMF value is inductively generated from said coils as a result of such relative movement.

2. The transducer of claim 1 wherein said armature is a rotor having a plurality of magnet pole elements thereon equiangularly spaced from one another about the axis of rotation of said rotor and disposed to so register with said first stator section pole elements.

3. The transducer of claim 2 wherein there are at least four of said magnet pole elements so disposed on said rotor.

4. The transducer of claim 2 wherein said first section of said stator comprises a first multiplicity of pole elements equiangularly spaced thereabout in a circular array.

5. The transducer of claim 2 wherein said rotor includes a second magnet section axially spaced from said first magnet section, each of said magnet sections having a plurality of said permanent magnet pole elements thereon, and wherein said stator has a second section axially spaced from said first section, said second section of said stator having at least two pole elements thereon each with an electrically conductive coil wound thereabout, said magnet pole elements of said first magnet section of said rotor being disposed to register sequentially with said pole elements of said first stator section, to coact as a first transducer section, and said magnet pole elements of said second magnet section of said rotor being disposed to register sequentially with said pole elements of said second stator section, to coact as a second transducer section.

6. The transducer of claim 5 wherein said magnet pole elements are all of the same strength, said magnet pole elements of said first rotor section being of opposite polarity to said magnet pole elements of said second rotor section.

7. The transducer of claim 6 wherein each magnet pole element of said first rotor section is mechanically aligned with a magnet pole element of said second rotor section, wherein each pole element of said first stator section is similarly aligned with a pole element of said second section, and wherein a single one of said coils is wound about each pair of aligned stator pole elements, different portions of each of said coils thereby being subject to the same magnetic flux moving in opposite directions so as to thereby balance back-EMF effects induced by such flux in said coils and produce no net back-EMF value therein.

8. The transducer of claim 6 wherein said transducer comprises a plurality of said circuits, said coil on at least one pole element of both of said stator sections comprising a leg of each of said circuits, and wherein at least one of (a) said magnet pole elements of said first rotor section relative to said magnet pole elements of said second rotor section, and (b) said pole elements of said first stator section relative to said pole elements of said second stator section, are mechanically offset so as to produce said out-of-phase flux density variation relationship in said stator pole elements on which are wound said coils comprising said legs of each of said circuits.

9. The transducer of claim 8 wherein said magnet pole elements of said rotor sections and said pole elements of said stator sections are so paired as to cause, in each of said transducer sections, two of said magnet pole elements of the same polarity to register simultaneously with two of said stator pole elements in each orientation of registration, said coils on said paired stator pole elements being series connected as a circuit leg and being wound with opposite sense so as to thereby balance back-EMF effects induced in said coils by flux from said magnet pole elements and produce no net back-EMF value in said circuit leg.

10. The transducer of claim 1 wherein said transducer further includes an additional sensor section, comprising an additional such stator section, an additional such magnet section, and additional such coils so disposed, wound, comprised and connected, the cycle frequency of signals generated from said additional sensor section being substantially different from the cycle frequency of signals generated from said first sensor section.

11. The transducer of claim 10 where in said armature is a rotor and wherein said cycle frequency of signals from said first sensor section is an even number in the range two to eight cycles per revolution of said rotor, and said cycle frequency of signals from said additional sensor section is in the range 20 to 100 cycles per revolution.

12. A differential reactance permanent magnet transducer comprising a stator and an armature, said transducer having a plurality of sensor sections, one of said sensor sections comprising a first stator section, a first magnet section on said armature, and a plurality of electrically conductive first coils, said first stator section having at least two pole elements thereon of ferromagnetic material, each stator pole element having one of said electrically conductive first coils wound thereabout, and said first magnet section of said armature having at least one permanent magnet pole element thereon, said pole elements being so disposed as to cause said magnet pole element to register sequentially with said pole elements of said first section of said stator as said armature moves relative to said stator, and being so disposed that the flux density variation produced in one of said stator pole elements by movement of said magnet pole element relative thereto varies in an out-of-phase relationship to the flux density variation produced in the other of said stator pole elements by such magnet pole element movement, said first coils being comprised of effectively equal numbers of turns and being connected in series to provide at least one circuit having terminals to enable the application of voltages thereacross and to enable measurement of voltage values at a junction between said coils thereof, each coil comprising a leg of said one circuit, whereby the values of voltages applied across said circuit will be so modulated by such relative movement of said armature as to enable the generation of signals from said first sensor section that vary sinusoidally as a function of armature position and reactance variation in said coils; another of said sensor sections comprising a second magnet section on said armature with at least one permanent magnet pole element thereon, a second stator section having at least two pole elements thereon of ferromagnetic material, and at least one electrically conductive second coil wound about said pole elements of said second stator section, said second magnet section being so disposed relative to said second stator section as to cause said two pole elements of said second stator section to be subjected simultaneously to a magnetic field of equal strength from said second magnet section, whereby the values of voltages applied across said second coil will be so modulated by relative movement of said armature as to enable the generation of a signal at the start of each cycle of armature movement; the electrical and mechanical features of said transducer being such that no net back-EMF value is inductively generated from any of said coils as a result of such relative movement.

13. The transducer of claim 12 wherein said second magnet section of said armature has at least two permanent magnet pole elements thereon, and wherein said transducer includes at least two second coils connected in series with one another, one of said second coil being wound about each pole element of said second stator section.

14. The transducer of claim 13 wherein said magnet pole elements of said second magnet section are of the same polarity, and wherein said second coils are wound in opposite directions about said second stator section pole elements, so that back-EMF induced in one of said second coils cancels back-EMF induced in the other of said second coils.

15. The transducer of claim 13 wherein said second magnet section of said armature has at least two permanent magnet pole elements of opposite polarity thereon, and wherein said at least one second coil is wound about both of said pole elements of said second stator section so as to functionally divide said second coil into two equivalent portions, back-EMF induced in one of said coil portions being equal and opposite to back-EMF induced in the other of said coil portions, so as to produce mutual cancellation thereof.

16. A differential reactance permanent magnet transducer comprised of a stator and a rotor, said transducer having a high-resolution sensor section capable of generating signals with a cycle frequency of 20 to 100 cycles per revolution of said rotor, a commutation sensor section capable of generating signals with an even-number cycle frequency of two to eight cycles per rotor revolution, and a home sensor section for generating a signal with a cycle frequency of one cycle per revolution, each of said high-resolution and commutation sensor sections separately comprising: a first stator section, a first magnet section on said armature, and a plurality of electrically conductive first coils, said first stator section having at least two pole elements thereon of ferromagnetic material, each stator pole element having one of said electrically conductive first coils wound thereabout, and said first magnet section of said armature having at least one permanent magnet pole element thereon, said pole elements being so disposed as to cause said magnet pole element to register sequentially with said pole elements of said first section of said stator as said armature moves relative to said stator, and being so disposed that the flux density variation produced in one of said stator pole elements by movement of said magnet pole element relative thereto varies in an out-of-phase relationship to the flux density variation produced in the other of said stator pole elements by such magnet pole element movement, said first coils being comprised of effectively equal numbers of turns and being connected in series to provide at least one circuit having terminals to enable the application of voltages thereacross and to enable measurement of voltage values at a junction between said coils thereof, each coil comprising a leg of said one circuit, whereby the values of voltages applied across said circuit will be so modulated by such relative movement of said armature as to enable the generation of signals from said first sensor section that vary sinusoidally as a function of armature position and reactance variation in said coils; said home sensor section comprising a second magnet section on said armature with at least one permanent magnet pole element thereon, a second stator section having at least two pole elements thereon of ferromagnetic material, and at least one electrically conductive second coil wound about said pole elements of said second stator section, said second magnet section being so disposed relative to said second stator section as to cause said two pole elements of said second stator section to be subjected simultaneously to a magnetic filed of equal strength from said second magnet section, whereby the values of voltages applied across said second coil will be so modulated by relative movement of said armature as to enable the generation of a signal at the start of each cycle of armature movement; the electrical and mechanical features of said transducer being such that no net back-EMF value is inductively generated from any of said coils as a result of such relative movement.

* * * * *